United States Patent [19]

Waltemeyer

[11] Patent Number: 4,934,319
[45] Date of Patent: Jun. 19, 1990

[54] COMBINATION BIRD FEEDER AND POST WITH CONNECTION DEVICE

[76] Inventor: H. James Waltemeyer, 4 Hillside Dr., Jacobus, Pa. 17407

[21] Appl. No.: 334,466

[22] Filed: Apr. 7, 1989

[51] Int. Cl.⁵ .............................................. A01K 39/00
[52] U.S. Cl. .................................. 119/52.2; 119/57.8; 403/227
[58] Field of Search ........................ 119/51, 52.2, 52.3, 119/57.8, 57.9; 248/231.9, 231.91; 403/227, 221

[56] References Cited

U.S. PATENT DOCUMENTS

| | | | |
|---|---|---|---|
| 2,129,933 | 9/1938 | Hueglin | 403/227 |
| 4,574,963 | 3/1986 | Fullenkamp | 403/227 |
| 4,657,299 | 5/1987 | Mahan | 403/227 |
| 4,765,277 | 8/1988 | Bailey et al. | 119/57.9 |

FOREIGN PATENT DOCUMENTS 840380  7/1949  Fed. Rep. of Germany ...... 403/227

*Primary Examiner*—John Weiss
*Attorney, Agent, or Firm*—C. Hercus Just

[57] ABSTRACT

A combination bird feeder, tubular post and a connection device which includes a bracket having similar ends attachable to the bottom of the feeder, a compressible member insertable in the upper end of the post, and a nut and bolt extendable through the bracket and compressible member and when the nut is tightened on the bolt, the compressible member expands and frictionally engages the interior of the upper end of the post and thereby secures the feeder to the post.

5 Claims, 1 Drawing Sheet

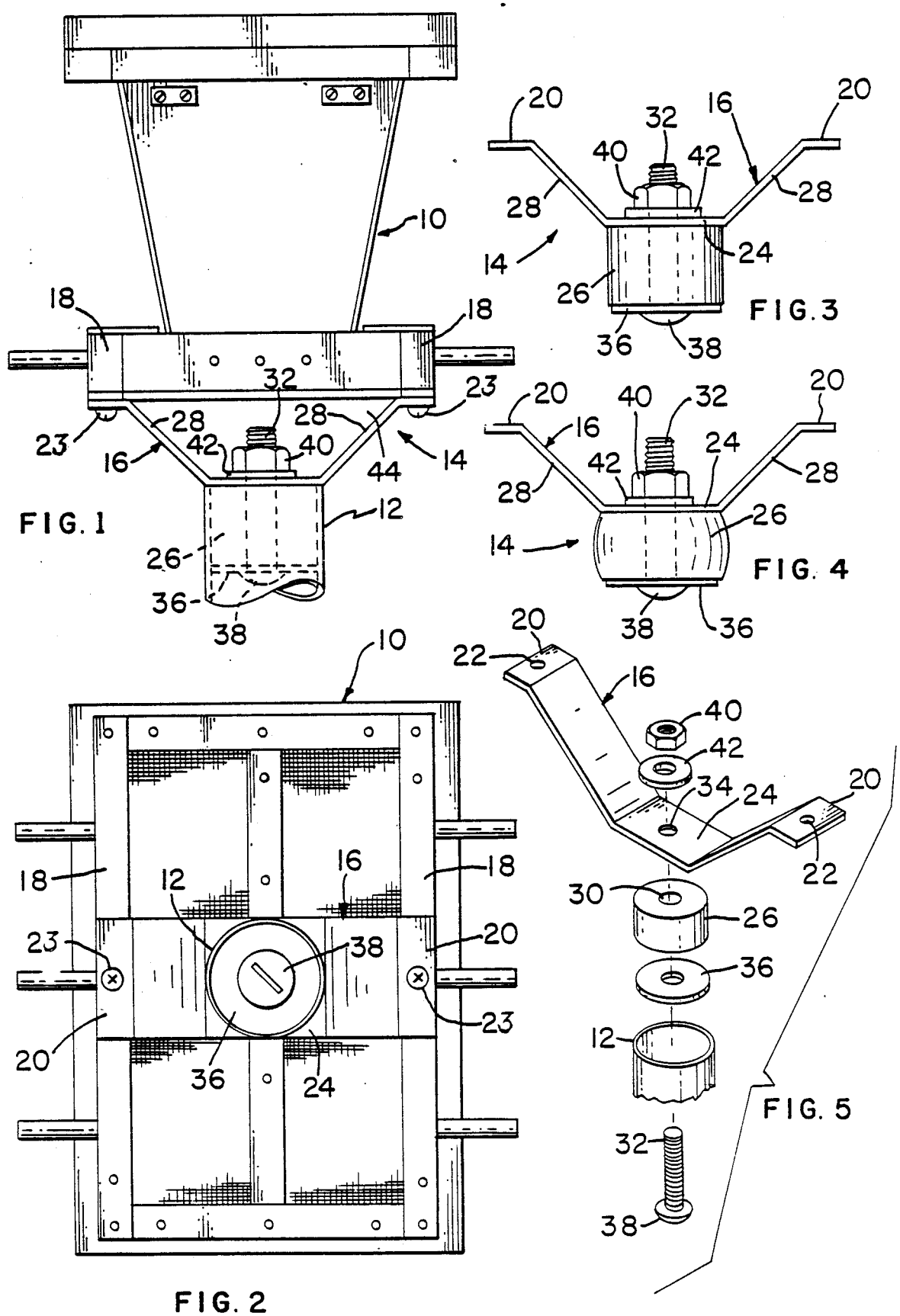

COMBINATION BIRD FEEDER AND POST WITH CONNECTION DEVICE

BACKGROUND OF THE INVENTION

This invention pertains to a bird feeder and especially the type known as wild bird feeders and essentially comprises the combination thereof with a post and means to attach the feeder to the upper end of the post. The present inventor is the owner of U.S. Design Pat. No. 299,568, dated Jan. 24, 1989. After completing the same and finding that it was desirable to connect the feeder to the upper end of a preferably tubular post of suitable height and diameter, it occurred to the applicant that, in addition to suspending such a feeder from a cord attached to overhead means, it also would be desirable to arrange means to connect the feeder to the upper end of a post.

One advantage of connecting the feeder to the upper end of a post is that many feeders are molested by squirrels and, if a post offers no means by which the squirrel may climb the post, the feeder is relatively safe from being reached by a squirrel and, hence, the present invention was conceived by the applicant to form a suitable attaching means for the purpose described.

Especially in the art of connecting rods, tubes and the like, it has long been known that compressible and expansible means can be used to effect suitable sealing between the telescoping members, whether a rod or tube, and threaded means have been provided to effect appropriate squeezing of annular circular members between the means to be connected and thereby effect a seal. Typical examples found in the prior art are represented by the following patents:

U.S. Pat. No. 1,038,834—Bloom Sept. 17, 1912
U.S. Pat. No. 2,278,479—Parker April 7, 1942
U.S. Pat. No. 2,420,778—Herold May 20, 1947
U.S. Pat. No. 2,493,556—Stone Jan. 3, 1950

SUMMARY OF THE INVENTION

It is among the principal objects of the present invention to provide a relatively simple device by which a bird feeder may be connected to the upper end of a tubular post and operation of the same may be accomplished simply by the use of a wrench to tighten a nut upon a bolt and by means of which a compressible and expansible rubber-like member may be inserted within the upper end of the post and by tightening the nut upon the bolt, the member is expanded into firm frictional engagement with the interior of the upper end of the post, the device being secured to the bottom surface of a bird feeder by simple means, such as screws, extending through opposite ends of a bracket, the bracket having a vertically-displaced central portion which is spaced from the bottom of the bird feeder, the bracket being suitably affixed to the compressible member by means of the bolt extending through a hole in the central portion of the bracket.

Another object of the invention is to employ a flat washer which engages the lower end of the compressible member when it is inserted in the upper end of the tubular post and thereby effect suitable compression of the member in an axial direction while the circumference is expanded for the desired frictional engagement with the interior surface of the upper end of the post, the washer preferably being of a diameter substantially equal to that of the compressible member.

Still another object of the invention is to form the bracket of a rigid strip of suitable material of sufficient length that it extends across opposite sides of the bottom of the feeder and said end portions comprising ears disposed within a common plane and said ends extend upwardly and outwardly from the central portion of the bracket which is in a plane parallel to but spaced below that in which said ears are disposed in order to provide a space to accommodate the threaded end and engaging nut by which the compressible member is expanded as described above.

Details of the foregoing objects and of the invention are set forth in the following specification and illustrated in the accompanying drawings comprising a part thereof.

BRIEF DESCRIPTION OF THE DRAWINGS

FIG. 1 is a side elevation of an exemplary bird feeder, fragmentary upper portion of a tubular post and a connecting device embodying the principles of the invention.

FIG. 2 is a bottom view of the combination shown in FIG. 1 and showing the tubular post in cross-section.

FIG. 3 is a side view of the connecting device when the compressible member is in unexpanded position.

FIG. 4 is a side view similar to FIG. 3, but showing the compressible member compressed in an axial direction and expanded laterally.

FIG. 5 is an exploded view of the elements of the connecting means shown in FIGS. 3 and 4, as well as in FIG. 1, the upper end of the post being illustrated fragmentarily.

DETAILED DESCRIPTION OF THE PREFERRED EMBODIMENT OF THE INVENTION

Referring to FIG. 1, there is illustrated therein a bird feeder 10, which is connected to the upper end portion of the fragmentarily illustrated tubular post 12 by a connecting device 14. For more details of the feeder 10, attention is directed to applicant's prior U.S. Design Pat. No. 299,568, but it is to be understood that the connecting means 14 is intended to be utilized between various other kinds of bird feeders having a suitable bottom to which the connecting device 14 may be secured.

The tubular post 12 may be formed of any suitable material such as metal, synthetic resin of a rigid nature, or otherwise. It will be understood that the post 12 is suitably supported either by one end extending into a hole in the earth or connected by suitable devices to fences, railings or otherwise. The connecting device 14 is relatively simple and comprises a bracket 16 which preferably is formed from a suitable strip of metal having length adequate to extend between opposite side members 18, for example, of the feeder 10. For example, the side members 18 may be formed of suitable wood, though not restricted thereto, and thus facilitate the attachment of the opposite ends of the bracket 16 thereto. While further not restricted thereto, and especially for purposes of durability, the bracket 16 may be formed from a suitable strip of aluminum which, for example, may be two inches wide and approximately one-eighth inch thick. The length will depend upon the width of the feeder to which the bracket is to be connected.

From all of the figures, except FIG. 2, it will be seen that the opposite ends of the bracket comprise attaching ears 20 which are provided with screw holes 22 for the reception of screws 23, which are best shown in FIGS. 1 and 2. It also will be seen from all of the figures, except FIG. 2, that the attaching ears 20 are within a common plane and are formed by being bent upwardly and outwardly from the central portion 24 of the bracket 16. Said central portion 24 preferably is parallel to the plane within which the ears 20 are disposed but spaced downwardly therefrom, as viewed in FIGS. 1, 3 and 4, and also when in use as set forth in certain of the claims.

A compressible and expansible member 26 has a predetermined length in an axial direction adequately to provide a periphery complementary to the inner surface of the tubular post 12 when in unexpanded position, as shown in exemplary manner in FIG. 3. The member 26 abuts the lower surface of the central portion 24 of the bracket, said surface being that which is opposite from which the intermediate portions 28 extend upwardly and outwardly and terminate in the ears 20. The member 26 has a central opening 30, shown best in FIG. 5, which, preferably, is of a diameter suitable to readily accommodate the threaded shank of bolt 32. Also, the central portion 24 of the bracket has a central hole 34, best shown in FIG. 5, through which the threaded end of bolt 32 extends when the device is assembled, as shown in FIGS. 1, 3 and 4. Further, a flat washer 36 preferably has a diameter commensurate with the diameter of member 26 and also has a central opening alignable with the opening 30 therein for accommodation of bolt 32.

When the bracket 16, member 26 and washer 36 are assembled with the central holes therein aligned, the bolt 32 extends therethrough and the head 38 of bolt 32 engages the lower surface of washer 36, while the upper end of the bolt extends through the hole 34 in the bracket and upon which a nut 40 is threaded to complete the assembly of the connecting device 14. When thus assembled, said device is secured to the bottom of a feeder 10 by means of screws 23, for example, and the unexpanded member 26 is inserted in the upper end of the post 12, following which the nut 40 is tightened upon the bolt 32 sufficiently to compress the opposite ends of the member 26 in a manner to expand the circumference thereof into firm frictional engagement with the inner surface of the upper end of post 12. If desired, another washer 42 may be disposed between the nut and central portion 24 of the bracket. It also is to be noted that the distance between the common plane in which the ears 20 are disposed and the plane of the central portion 24 of the bracket is such as to form a space 44, shown in FIG. 1, within which the projecting end of the bolt 32 and the nut 40 readily are accommodated and, even when the connecting device 14 is attached to the bottom of feeder 10, there is ample space within which to manipulate a wrench to tighten the nut 40 as aforesaid.

From the foregoing, it will be seen that the present invention comprises a relatively simple connecting device by which a bird feeder may be firmly connected to the upper end of a tubular post by simple operation of a wrench. Similarly and conversely, by loosening the nut 40 upon the bolt 32, the connecting device may be removed from the upper end of the post 12, such as for purposes of suitably cleaning or finishing the feeder, or for any other purpose.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. In combination, a bird feeder having a bottom, a tubular post and a device to connect the same, said device comprising a bracket having laterally-spaced ears connectable to the bottom of the feeder and an intermediate portion spaced downwardly from said ears to provide a nut-receiving space, and having a bolt-receiving hole therein, a compressible member of predetermined length and complementary in diameter initially to the interior of said post, said compressible member having an axial hole similar in diameter to said bolt-receiving hole in said intermediate portion of said bracket, a flat washer-like member commensurate in diameter to that of said compressible member and having a bolt-receiving hole similar to that in said compressible member, a bolt extending commonly through the aligned holes in said bracket and said compressible member and said washer, and the threaded end of said bolt terminating in said nut-receiving space, and a nut disposed in said nut-receiving space and threadable onto said bolt and operable when tightened on said bolt to cause said compressible member to be compressed and thereby expand the circumference of said member into firm frictional engagement with the interior of one end of said tubular post to firmly secure said feeder to said end of said post.

2. The combination according to claim 1 in which said ears of said bracket are within a common plane and said intermediate portion is within a plane parallel to said common plane of said ears but spaced below the latter plane when in use to form said nut-receiving space between said planes.

3. A connection device to secure the bottom of a bird feeder to the upper end of a tubular post, said device comprising in combination, a bracket formed from a rigid strip of material of sufficient length to extend across the bottom of such feeder, said strip having a central flat portion provided with a bolt-receiving hole and the opposite end portions being similarly bent upwardly and outwardly respectively from the plane of said central portion and comprising ears commonly within a plane parallel to but spaced from the plane of said central portion to provide a nut-receiving space, a compressible and expandable circular member of rubber-like nature having a predetermined length and an outer uniform diameter complementary to the inner diameter of a tubular post into which it is adapted to be disposed when a feeder is to be connected to such a post, said member having a central axial bolt-receiving hole therethrough, a flat washer similar in diameter to that of said member and abutting one end of said member and the other end of said member abutting the surface of said central portion of said bracket which is opposite the surface from which said ears extend upwardly, a headed bolt extending through the holes in said washer and member and central portion of said bracket with the head thereof abutting said washer and the opposite threaded end of said bolt being disposed in said nut-receiving space, and a nut disposed in said nut-receiving space and engaging the threaded end of said bolt and engaging the opposite surface of said central portion of said bracket from that engaged by said compressible member, whereby said nut can be tightened upon said bolt sufficiently to expand the circumference of said compressible member into frictional engagement with the inner surface of a post when said member is inserted therein.

4. The connection device according to claim 3 in which said ears are provided with screw-receiving holes and the space between the common plane of said ears and the plane of said central portion is of a height adequate to accommodate said nut and the end portion of the bolt upon which it is threaded, whereby said nut may be engaged by a wrench when the device is secured to the bottom of a feeder and said compressible member is inserted in the upper end of a post.

5. The connection device according to claim 3 in which said ears are connected to said central portion of said brackets respectively by intermediate portions which extend upward and outward between said ears and central portion.

* * * * *